United States Patent [19]
Suzuki

[11] Patent Number: 5,248,282
[45] Date of Patent: Sep. 28, 1993

[54] OIL-OPERATED TENSIONER

[75] Inventor: Tadasu Suzuki, Tokyo, Japan

[73] Assignee: Tsubakimoto Chain Co., Higashimurayama, Japan

[21] Appl. No.: 964,349

[22] Filed: Oct. 21, 1992

[30] Foreign Application Priority Data

Oct. 23, 1991 [JP] Japan ................................ 3-94626[U]

[51] Int. Cl.⁵ .................................................. F16H 7/08
[52] U.S. Cl. ............................................ 474/110; 474/138
[58] Field of Search ............... 474/101, 103, 104, 109, 474/110, 111, 113–117, 133–138

[56] References Cited

U.S. PATENT DOCUMENTS

| | | | |
|---|---|---|---|
| 4,909,777 | 3/1990 | Inoue et al. | 474/110 |
| 5,181,889 | 1/1993 | Maruyama et al. | 474/110 |

*Primary Examiner*—Thuy M. Bui
*Attorney, Agent, or Firm*—Howson & Howson

[57] ABSTRACT

A chain tensioner utilizing oil as an operating fluid comprises a housing having a vertical bore and a plunger projecting upward through an opening at the upper end of the bore and urged by a spring in the projecting direction. The plunger has an internal oil reservoir formed near its upper end, a passage leading from the reservoir to a high-pressure oil chamber formed by the housing and plunger, a check valve preventing flow from the high-pressure chamber to the reservoir, and an opening permitting flow of oil into the reservoir. A second oil reservoir, annular in shape, is formed in the housing at the location of the opening to provide an oil seal between the plunger and the wall of the bore. This oil seal prevents air from flowing between the plunger and the wall of the bore into the high-pressure chamber. In one embodiment, an auxiliary spring is located in the second oil reservoir.

2 Claims, 4 Drawing Sheets

OIL-OPERATED TENSIONER

BRIEF SUMMARY OF THE INVENTION

This invention relates to improvements in hydraulic tensioners of the kind used to apply tension to a power-transmitting chain or the like in a machine such as an internal combustion engine. It relates more particularly to tensioners comprising a plunger and cylinder and utilizing oil to control the rate at which the plunger advances and retracts.

In a conventional oil-operated tensioner, a plunger fits slidably into a hollow cylinder so as to form a high-pressure chamber defined by the plunger and the walls of the cylinder. The plunger is urged in the projecting direction by a spring in order to apply tension to a power transmitting chain, belt or the like. When the plunger moves outward, oil is supplied at a rapid rate from a reservoir into the high pressure chamber. When the plunger withdraws, the oil is gradually discharged from the high-pressure chamber into the reservoir.

The conventional tensioner has a drawback in that its oil reservoir is located on the exterior of the housing forming the cylinder, and consequently the device is large in size. The large size of the tensioner limits the locations in which it can be mounted, and restricts the available space for mounting other machine elements and peripheral equipment. Furthermore, unless a seal is provided between the plunger and the wall of the cylinder, air can enter the high-pressure chamber and cause a malfunction. Thus, in order to prevent the entry of air, an oil seal or an O-ring are ordinarily provided between the wall of the cylinder and the plunger. The use of the oil seal or the O-ring, however, prevents the plunger from moving smoothly, and results in increased cost.

The principal object of this invention is to provide an oil-operated tensioner which is smaller in size than a conventional tensioner having similar capabilities. Another object of the invention is to eliminate the need for a seal or O-ring between the plunger and cylinder wall in a tensioner. Still further objects of the invention are to reduce the cost of an oil-operated tensioner, to simplify its manufacture, and to improve its performance.

This invention addresses the foregoing objects by providing an oil reservoir inside the plunger and by providing a second, annular-shaped, reservoir in the cylinder, near the open end thereof, and surrounding the plunger. More specifically, the tensioner in accordance with the invention comprises a housing having a bore with a cylindrical wall, the bore having an opening at one end; a plunger having forward and rearward ends, the plunger being slidable in the housing and projecting outwardly from the bore through the opening, the plunger and the housing together defining a high pressure chamber; spring means for urging the plunger outward from the bore; an oil reservoir; means providing an oil passage extending between the oil reservoir and the high pressure chamber; and check valve means in the oil passage, the check valve means allowing flow of oil through the passage into the high pressure chamber, but preventing flow of oil through the passage from the high pressure chamber into the reservoir; wherein the oil reservoir is formed inside the plunger. In a preferred embodiment, a second oil reservoir is provided. The second oil reservoir is annular in shape, and formed on the housing at the opening of the cylindrical bore. It surrounds the plunger, whereby oil within the second reservoir provides a seal between the plunger and the housing to prevent air from passing between the plunger and the cylindrical wall of the bore and entering the high pressure chamber.

The preferred form of tensioner is installed in an engine with the forward end of the plunger directed upward. Lubricating oil which splashes in the enclosure in which the tensioner is located enters the reservoir within the plunger through an opening in the plunger. Oil leaking through the check valve will also accumulate in the reservoir. The reservoir within the plunger, therefore, is always supplied with oil. When the plunger moves outward, the check valve opens to supply the oil from the first reservoir to the high-pressure chamber in response to the increasing volume of the high-pressure chamber.

The annular second reservoir, provided at the forward end of the cylinder and surrounding the plunger, also has its opening facing upward. Therefore splashing oil is automatically supplied to the second reservoir during operation of the tensioner. Oil also enters the second reservoir by leakage through the clearance between the plunger and the cylinder wall. The oil accumulated in the second reservoir prevents entry of the air into the high pressure chamber as the plunger moves outward.

DETAILED DESCRIPTION

Figure 4:
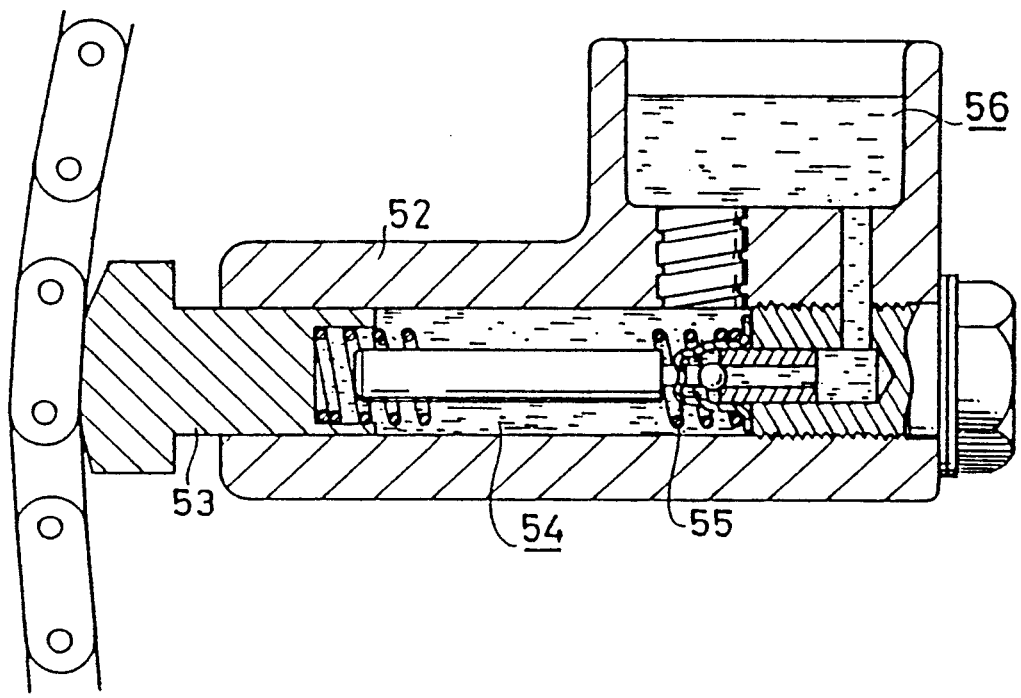
FIG. 4 is an axial section of a prior-art tensioner.

In a conventional oil-operated tensioner as shown in FIG. 4 a plunger 53 is slidable in a cylindrical bore in a housing 52, and, together with the housing, defines a high-pressure chamber 54. Plunger 53 is urged outwardly by a spring 55 to apply tension to a power transmitting chain. When the plunger 53 moves outward, oil is supplied at a rapid rate from a reservoir 56, formed on the exterior of the housing, into the high pressure chamber 54. When the plunger 53 withdraws, the oil is gradually discharged from the high-pressure chamber 54 into reservoir 56.

The above-described conventional tensioner has the disadvantage that its reservoir 56, being located on the exterior of the housing 52, increases the overall size of the housing. It also has the disadvantage that, because it has no seal between plunger 53 and the housing 52, air will enter the high-pressure chamber 54 as the plunger moves outward. The entry of air will ultimately cause a malfunction. To prevent the entry of the air, an oil seal or an O-ring may be provided between the interior wall of housing 52 and plunger 53. The use of the oil seal or O-ring, however, will adversely affect smooth movement of the plunger 53, and result in increased manufacturing cost.

Figure 1:
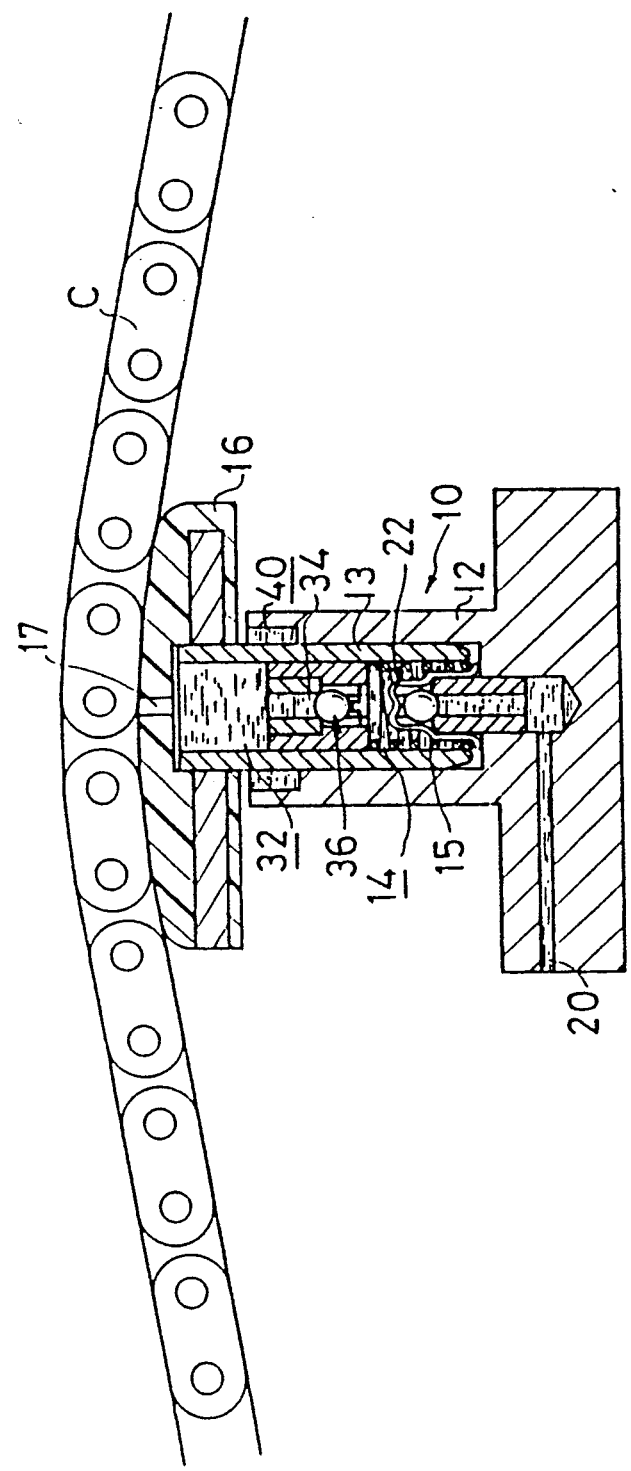
FIG. 1 is an axial section of a first embodiment of a tensioner according to the invention.

In the first embodiment of the invention, as shown in FIG. 1, a tensioner 10 comprises a housing 12 having a hollow, cylindrical, vertically disposed bore, with an opening at its upper end and a plunger 13 slidable therein. The interior wall of the bore of the housing 12 and the plunger 13 together define a high-pressure chamber 14. The plunger is hollow so that the high pressure chamber is at least partially surrounded by the wall of the plunger at its lower end. Plunger 1 is urged outwardly by the force of a spring 15, which is installed inside the high-pressure chamber 14 and within the hollow lower portion of the plunger. The plunger applies tension to a chain C by means of a shoe 16, which is secured to the upper end of plunger 13.

Oil pressure is applied to high-pressure chamber 14 from an external source such as an oil pump (not shown), which may be operated by the same engine which utilizes chain C. Thus, as is desirable, the tensioner utilizes both the force of the spring and the force exerted by the pressure of the oil, to apply tension to the chain. In housing 12, therefore, there is provided an oil passage 20 communicating with the external oil pressure source. The oil from the external oil pressure source is supplied to the high-pressure chamber via a check valve 22, which prevents back flow of the oil from high-pressure chamber 14 into oil passage 20. A first reservoir 32 is formed inside the plunger at its forward end. An oil passage 34 extends from high-pressure chamber 14 to this reservoir 32. In this oil passage 34, there is provided a check valve 36, which permits flow of the oil into the high-pressure chamber 14, but prevents flow of oil from the high pressure chamber into reservoir 32. The oil passage and check valve are provided in an insert which is fixed in the interior of the tubular plunger body, separating the reservoir 32 from the hollow space at the lower end of the plunger body.

As tensioner 10 is usually used inside a compartment of an engine in which lubricating oil is splashed due to the movement of the chain, sprockets and other parts, the oil will accumulate in reservoir 32, passing through a hole 17 formed in the tensioner shoe 16. This hole also functions as an air vent, functioning to discharge air from the inside of reservoir 32. The external opening of the hole faces upward and is located above the oil-containing part of the reservoir.

At the forward end of the housing 12, an annular second reservoir 40 is formed in the bore. This annular reservoir surrounds the plunger 13, and serves as a seal to prevent the entry of air into the high pressure chamber. Oil is supplied to chamber 14 through check valves 22 and 36 from the first reservoir 32 and the external oil pressure source. If the pressure of the external oil pressure source is low, and plunger 13 suddenly moves outward, a negative pressure may develop in high-pressure chamber 14, which would tend to draw air into the high-pressure chamber 14, through the clearance between the housing 12 and the plunger 13. Entry of air into the high pressure chamber is prevented by virtue of the presence of oil in annular reservoir 40. Reservoir 14 is open at the upper end of housing 12, and is maintained filled with oil by virtue of the splashing of oil which takes place as the result of movement of the chain and other moving components of the mechanism of which the tensioner is a part. Additionally, a quantity of oil from the high pressure chamber can enter reservoir through the space between the plunger and the bore as the plunger retracts.

Figure 2:
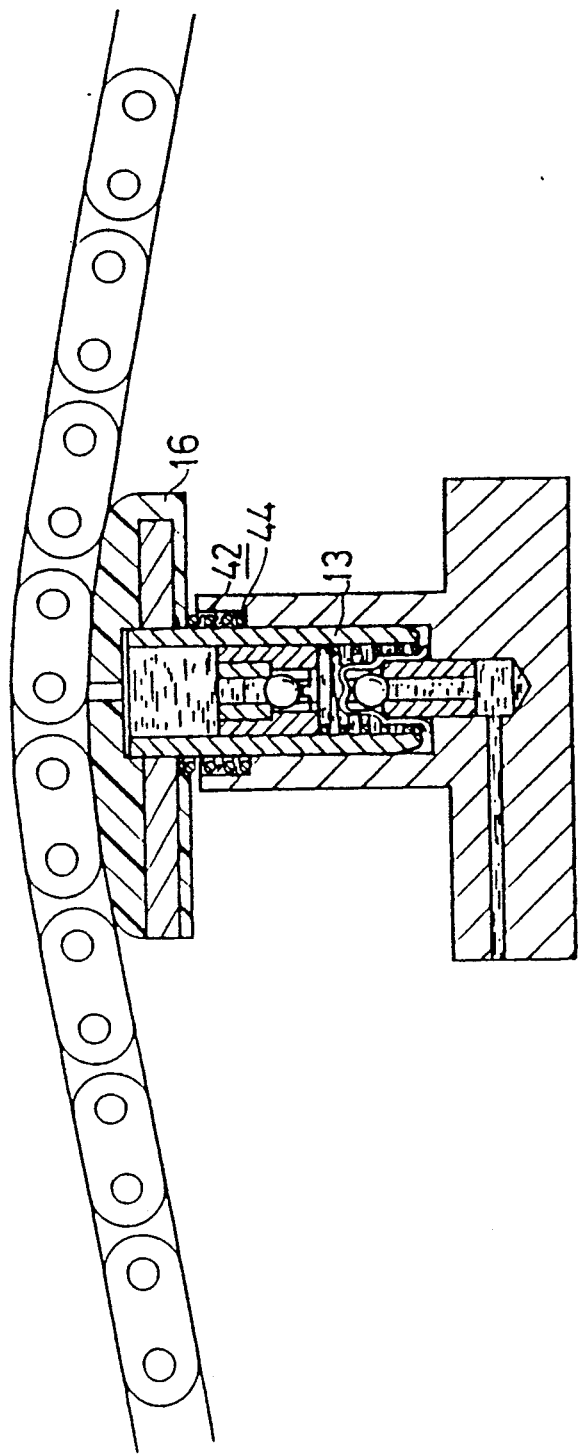
FIG. 2 is an axial section of a second embodiment of the tensioner.

In the second embodiment of the tensioner, as shown in FIG. 2, an auxiliary spring 44 is provided in the annular reservoir 42, to assist the main spring in the high pressure chamber in urging the plunger 13 outwardly.

Figure 3:
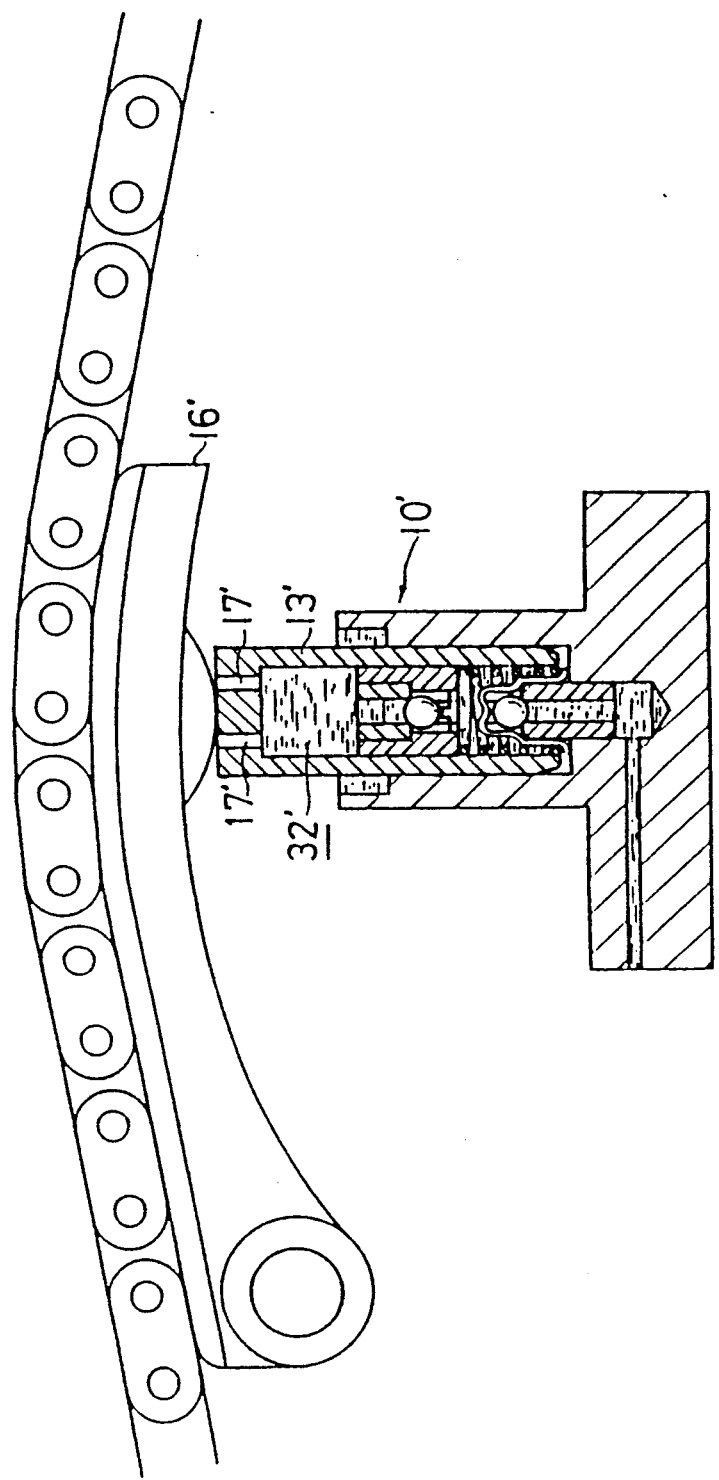
FIG. 3 is an axial section of a third embodiment of the tensioner.

In the third embodiment of the tensioner, as shown in FIG. 3, a tensioner 10' provided with a separate tension lever 16', pivoted at one end and rocked into engagement with a power transmission chain by a vertically movable plunger 13'. The plunger has an internal reservoir 32' with holes 17' at its forward end for release of air from reservoir 32' and for receiving splashed oil. The holes are positioned to the sides of the central axis of plunger in order not to be covered by the rounded portion of tension lever 16' which is engaged by the plunger. Otherwise, plunger 13' is identical to the plunger of the first embodiment as shown in FIG. 1.

As a result of the positioning of the reservoir in the interior of the plunger, the tensioner can be made as compact in size and as light in weight as a tensioner having no reservoir. By sealing the plunger with oil in an annular recess in the wall of the bore of the housing, it is possible to eliminate an oil seal or an O-ring between the housing and the plunger. Therefore, it is possible to reduce the cost of the tensioner and to prevent the entry of air into the tensioner without adversely affecting smooth movement of the plunger.

Various modifications can be made to the tensioners as described herein. For example, while it is desirable to position the plunger and the bore in which it slides on a vertical axis, the axis of the plunger and bore can be oblique, and nevertheless splashed oil can be accumulated in the internal reservoir in the plunger and in the annular reservoir. The plunger can even be made horizontal, or pointed downward, if appropriate openings are provided in the plunger and located above the oil-containing portion of the reservoir, or if other provisions are made for the entry of oil into the reservoir. Still other modifications can be made to the tensioners described above without departing from the scope of the invention as defined by the following claims.

I claim:

1. A oil-operated tensioner comprising: a housing having a bore with a cylindrical wall, the bore having an opening at one end; a plunger having forward and rearward ends, the plunger being slidable in the housing and projecting outwardly from the bore through the opening, the plunger and the housing together defining a high pressure chamber; spring means for urging the plunger outward from the bore; an oil reservoir; means providing an oil passage extending between the oil reservoir and the high pressure chamber; and check valve means in the oil passage, the check valve means allowing flow of oil through the passage into the high pressure chamber, but preventing flow of oil through the passage from the high pressure chamber into the reservoir; wherein the oil reservoir is formed inside the plunger.

2. An oil-operated tensioner according to claim 1 further comprising a second oil reservoir, the second oil reservoir being annular in shape, formed on the housing at the opening of the cylindrical bore, and surrounding the plunger, whereby oil within the second reservoir provides a seal between the plunger and the housing to prevent air from passing between the plunger and the cylindrical wall of the bore and entering the high pressure chamber.

* * * * *